United States Patent [19]

Yauch et al.

[11] Patent Number: 5,206,586
[45] Date of Patent: Apr. 27, 1993

[54] MAGNETOSTRICTIVE POSITION TRANSDUCER HAVING SQUARE-WAVE-IN-QUADRATURE-OUTPUT

[75] Inventors: Steven S. Yauch, Raleigh; Wade D. Peterson, Morrisville; Lawrence J. Russell, Knightdale, all of N.C.

[73] Assignee: MTS Systems Corporation, Eden Prairie, Minn.

[21] Appl. No.: 913,739

[22] Filed: Jul. 14, 1992

Related U.S. Application Data

[63] Continuation of Ser. No. 667,565, Mar. 11, 1991, abandoned.

[51] Int. Cl.⁵ .................... G01B 7/14; G01F 23/30
[52] U.S. Cl. ...................... 324/207.13; 324/207.24
[58] Field of Search ............ 324/207.11, 207.13, 324/207.24, 207.22, 209, 262, 226; 367/127, 128; 73/597; 333/148, 149

[56] References Cited

U.S. PATENT DOCUMENTS

| | | |
|---|---|---|
| 3,898,555 | 8/1975 | Tellerman . |
| 4,071,818 | 1/1978 | Krisst . |
| 4,121,155 | 8/1978 | Chamuel . |
| 4,319,189 | 3/1982 | Cullum, Jr. et al. . |
| 4,433,291 | 2/1984 | Yariv et al. . |
| 4,654,590 | 3/1987 | Kitaura et al. ............ 324/207.13 |
| 4,678,993 | 7/1987 | Vinnemann et al. . |
| 4,721,902 | 1/1988 | Tellerman et al. . |
| 4,726,226 | 2/1988 | Tellerman . |
| 4,803,427 | 2/1989 | Mason et al. . |

FOREIGN PATENT DOCUMENTS 1065678 11/1984 U.S.S.R. .................... 324/207.13

OTHER PUBLICATIONS

*Electronique Industrielle* No. 9, 1 Feb. 1981, Paris, France, pp. 66–67; Louis Pierre, "Le capteur magneto-sonique mesure less deplacements, positions, vitesses".

Patent Abstracts of Japan vol. 004, No. 078 (P-014), 6 Jun. 1980 & JP A55042062 (Canon Inc.) 25 Mar. 1980.

*Primary Examiner*—Walter E. Snow
*Attorney, Agent, or Firm*—Merchant, Gould, Smith, Edell, Welter & Schmidt

[57] ABSTRACT

A magnetostrictive position measuring instrument for generating square-wave-in-quadrature output pulses indicating magnet position along a waveguide.

11 Claims, 20 Drawing Sheets

MAGNETOSTRICTIVE POSITION TRANSDUCER HAVING SQUARE-WAVE-IN-QUADRATURE-OUTPUT

BACKGROUND OF THE INVENTION

The present application is a continuation of the United States patent application Ser. No. 07/667,565, filed Mar. 11, 1991, now abandoned.

FIELD OF THE INVENTION

The present invention relates to linear position magnetostrictive transducers, and more particularly to a transducer which generates an emulated square-wave-in-quadrature encoder output, providing quadrature pulses indicating the location of a position magnet along the length of a magnetostrictive gauge.

DESCRIPTION OF THE PRIOR ART

Magnetostrictive linear position transducers, are robust, high resolution instruments which have proven to be useful in many measurement and control applications. Commercial magnetostrictive transducers have been available in a number of mechanical and electrical configurations. Transducers are available with 0-10 Volt, or 4-20 mA, analog signal outputs where the analog level indicates the measured distance. Some transducers have been available with a timed TTL pulse output where the analog time interval between output pulses indicates the measured distance. It is expected that magnetostrictive devices will become more commonly used in applications which currently rely on incremental encoder technologies to transduce position into an analog output voltage. Adoption of magnetostrictive transducers will be facilitated by providing sensors which emulate or mimic industry standard interface protocols, particularly current mode signalling standards, as taught by the present invention. Examples of pertinent magnetostrictive transducer prior art include:

U.S. Pat. No. 3,898,555 to Tellerman, which discloses a basic magnetostrictive linear position measurement system. A position indicating magnet is positioned along the length of a tubular magnetostrictive waveguide. A pulse generator is used to generate a current pulse in the waveguide. The position magnet interacts with the waveguide magnetic field, generating an acoustic reaction wave in the waveguide at the location of the position magnet. The time of flight of the acoustic wave indicates the position of the magnet in relation to a "mode converter" which is attached to the waveguide and translates the mechanical energy of the acoustic echo pulse into an electrical signal. In Tellerman, the time intervals between excitation of the wave guide to the detection of the echo controls the application of a DC reference voltage to an analog filter system which, in turn, generates an averaged DC level indicating position. In this fashion the returned acoustic pulse develops a signal which is converted to an output voltage level which indicates position.

U.S. Pat. No. 4,721,902 to Tellerman, teaches, inter alia, a method of increasing the resolution of the position indication by a technique now called "recirculation". In operation the echo pulse is used to initiate the next interrogation or excitation pulse applied to the waveguide. In this sense the return echoes are recirculated. The time measurements of multiple recirculations can be averaged to enhance resolution.

This Tellerman patent also teaches the use of a counter based interval timer. In general, the interrogation pulse starts a counter which collects counts from a clock source. The counting process is stopped with a return echo. In this fashion, the time of flight of the sonic pulse is translated into a representative count. The count is then converted into a corresponding analog voltage.

This Tellerman patent also teaches a time domain filtering technique which sets the duration of an "inhibit timer" based upon the historical output of the transducer. In general the raw count data is used to set an "inhibit" time interval which is slightly shorter than the expected echo delay time. The output of the mode converter is ignored until the inhibit time has elapsed. This inhibit time is not velocity dependent although it does vary as a function of magnet position. In practice this time domain filtering technique limits the maximum slew rate of the magnet.

However, none of the representative prior art magnetostrictive transducers generates a quadrature output, indicating position. Also, none of the prior art transducers provide a burst mode or index feature, user's controller to access the absolute nature of the transducer.

BRIEF SUMMARY OF THE INVENTION

In contrast to prior art structures, the present invention permits the utilization of magnetostrictive transducers with controllers which rely on, or expect current mode quadrature pulses to indicate position.

The emulation of a quadrature encoder output, the generation of burst and index data, as well as the measurement of waveguide gradient are performed in a hybrid analog/digital system, which incorporates a microprocessor. An understanding of the invention in summary form requires some familiarity with the overall architecture of the illustrative transducer described herein.

In general, the user imbeds the transducer module in a measurement or control application where position information is required by a user supplied controller.

The transducer module itself, is partitioned into a magnetostrictive sensor module, and an output conversion module.

The sensor module is of conventional design and it provides time domain logic level signals corresponding to magnet position. The sensor module interrogates the waveguide in response to logic level interrogation signals supplied by the output conversion module.

Within the conversion module, the sensor is connected to counter-control logic. The counter-control logic develops a "raw count" number from multiple interrogations of the waveguide. This raw count data is transferred to the microprocessor under software control.

The microprocessor combines the user parameter information with the raw count data to generate quadrature pulse count and quadrature velocity data. The quadrature data is transferred to a quadrature pulse generator which translates this data into standard square-wave-in-quadrature pulses, which are supplied to the user's controller system through a wire interface shown as channel A and channel B and channel Z. Three of the main processes performed by the microprocessor are: "interrogation and recirculation control", "math conversion into quadrature data", and "generation of quadrature pulses". These processes are independent and their independence is an important aspect of the invention. These processes may operate simultaneously.

The illustrative transducer also provides an "index" channel output and a "burst" mode. During set up, the user may position the magnet at any position along the active stroke of the waveguide, and record this position as an index position by toggling an appropriate switch. The count value corresponding to the "indexed" position is retained in a non-volatile memory. In operation, each time the magnet traverses the indexed location the system emits an index pulse on an output channel of the transducer. This feature is important in many machine control environments.

Burst mode permits the user's controller to access the absolute nature of the underlying magnetostrictive transducer. In burst mode the quadrature channels are toggled at a fixed frequency to deliver a set number of pulses to the controller. The number of pulses is directly proportional to the distance between the magnet and the originally defined index position. This data is available on demand or asynchronously. The specific embodiment of the invention generates RS 422 standard current pulses although TTL or other current mode standards are suitable as well.

The exemplary transducer also includes structures to monitor the propagation velocity gradient of the waveguide. Although propagation velocity is relatively constant for an individual waveguide, it may vary slightly from waveguide to waveguide. For high accuracy and high resolution applications, waveguide gradient is individually measured and the electronics are matched to the specific waveguide. In the present invention the user may define a fixed distance along the waveguide and the transducer will measure the actual gradient exhibited by the transducer in that particular application. This measured gradient value may also be stored in non-volatile memory and used for quadrature calculations.

BRIEF DESCRIPTION OF THE DRAWING

Throughout the figures, identical reference numerals refer to identical structural elements, wherein:

FIG. 5I is a flow chart showing the microprocessor routine for the burst mode.

DETAILED DESCRIPTION OF THE PREFERRED EMBODIMENT

Transducer Module Organization

Figure 1:
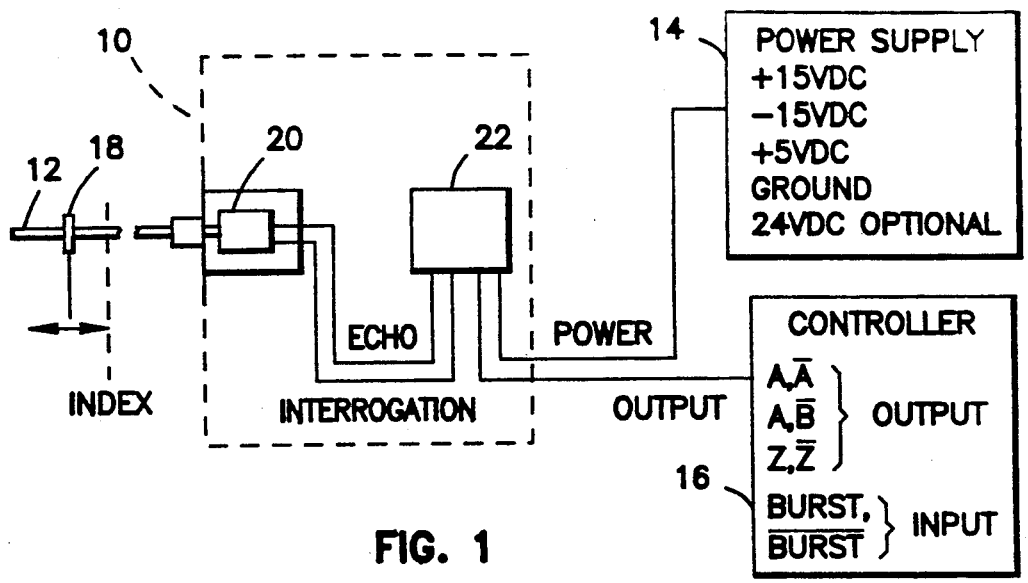
FIG. 1 is a system level schematic diagram depicting the transducer embedded in a user application.

FIG. 1 depicts the magnetostrictive transducer module 10 embedded in a measurement and control application. The user supplies an appropriate bipolar power supply 14 and an appropriate control system 16 which utilizes the output of the transducer module 10. The user also locates the measurement waveguide 12 in the application and provides a suitable mount for the magnet 18. The transducer module 10 is partitioned into a magnetostrictive sensor module 20 and an output conversion module 22 each within suitable housings.

Sensor Module Organization

Figure 2:
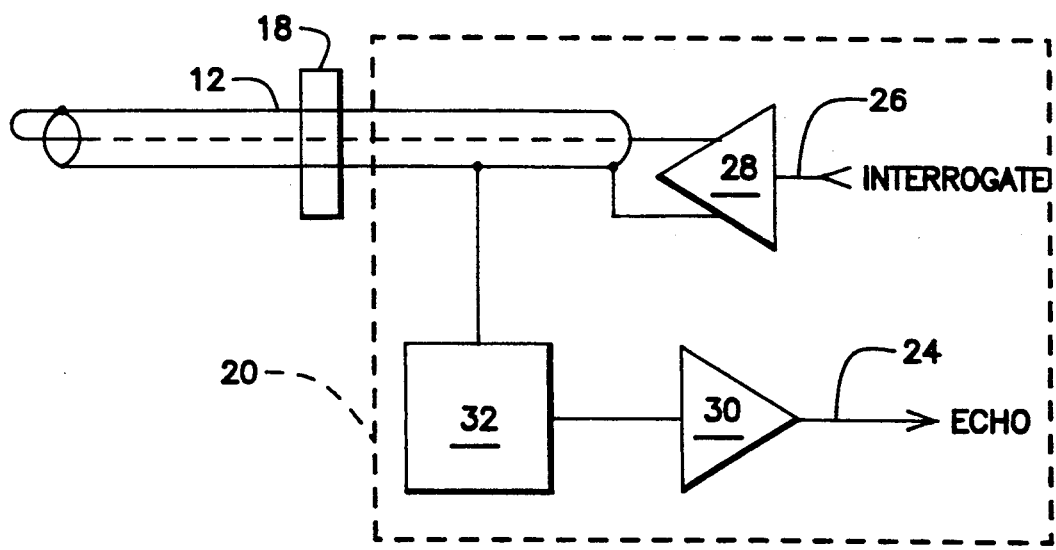
FIG. 2 is a block level schematic diagram depicting the elements of the magnetostrictive sensor module.

FIG. 2 depicts the sensor module 20. This module includes the magnetostrictive waveguide 12 and the associated pulse generator circuitry 28 and mode converter 32. These elements together interrogate the waveguide to determine the location of the magnet 18, in response to a logic level "interrogation" pulse, supplied on connection 26, and return a logic level "echo" signal, on connection 24 after a delay time which indicates the location of the magnet.

In use, the sensor module interrogates the waveguide 12, by generating a magnet field around the waveguide through the application of a current pulse. The current pulse is generated in response to an "interrogation" command. The sensor module also receives the resultant acoustic echoes, with a suitable mode converter 32. The mode converter 32 is physically coupled to the waveguide. This device converts the energy of passing sonic pulses into a corresponding electrical signal. The output of the mode convertor is amplified, compared with an appropriate reference level, and level shifted to generate a logic level "echo" signal on signal lead 24 indicating the reception of an acoustic pulse. This collection of elements is of conventional design and reference may be had to other patents and in particular, U.S. patent application Ser. No. 07/644,273 filed Jan. 22, 1991, now U.S. Pat. No. 5,115,195, entitled Multi-Magnet Long Stroke Sensor; U.S. Pat. No. 3,898,55 to Tellerman and U.S. Pat. No. 4,721,902 to Tellerman, incorporated herein by reference, for examples of suitable magnetostrictive elements for exciting the waveguide and for collecting acoustic pulses off the waveguide.

Output Conversion Module Organization

Figure 3:
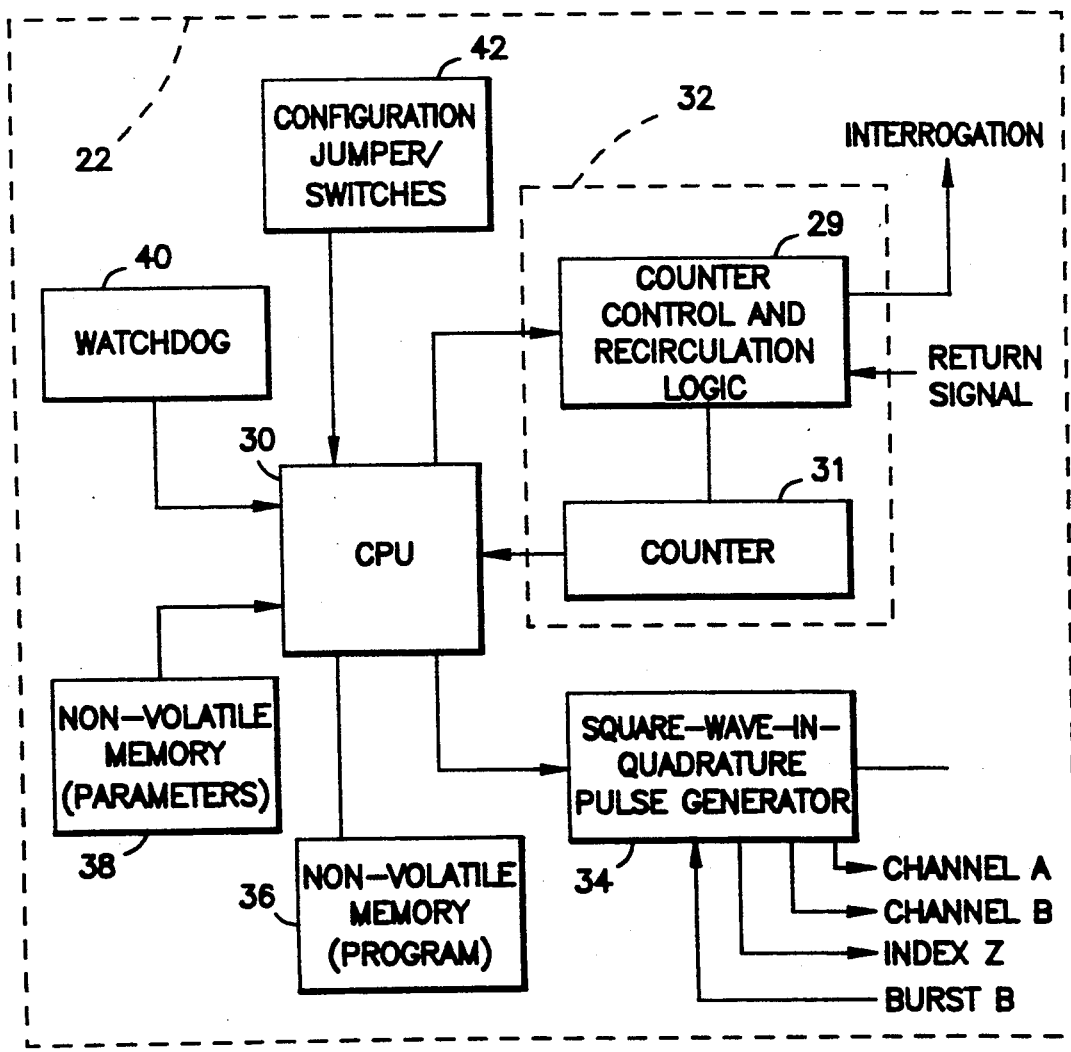
FIG. 3 is a block level schematic diagram depicting the partitioning of digital hardware, within the output conversion module.

FIG. 3 shows the output conversion module 22. The conversion module 22 is partitioned as shown in the figure with certain system functions performed in software, while other functions are performed predominantly in hardware.

This module interfaces to the sensor module 20 through logic level "interrogation" and "echo" signals, on connections 26 and 24 respectively and delivers synthesized RS 422 quadrature pulses and other information to the user's control system 16 on connection 25.

These quadrature signals are current mode signals typically delivered to twisted wire pairs coupled to the user's controller 16. Channels A and B are 90 degrees out of phase and the phase relation between the channels indicates the direction of magnet motion. In general, the rate at which the quadrature pulses are delivered, encodes the speed of the magnet 18. In the present invention velocity data is computed and an inherent lag exists between the quadrature signal and the actual motion of the magnet 18. Channel Z is devoted to index data. An RS 422 current pulse is delivered to channel Z each time the magnet sweeps by the user defined index point. Burst mode toggles channel A and B at a fixed frequency and supplies a number of pulses proportional to the distance between the current magnet position and the index point.

In general, counter control and recirculation control logic 29 in the counter-control logic 33 issues the interrogation signals, which result in the application of excitation pulses to the waveguide. The control logic also responds to mode converter "echo" signals resulting from the reception of acoustic pulses formed in reaction to excitation pulses. Typically the received echo will be recirculated to generate the next interrogation pulse.

During this recirculation process a counter 31 collects clock pulses. After a fixed number of recirculations the "last" echo will freeze the count in the counter 31. At this point the counter will contain a number of clock counts called the "raw count", which corresponds to the time interval between successive excitations and echoes. The value of the raw count depends in part on the number of "recirculations", and in part on the position of the magnet.

The raw count data is transferred to the microprocessor 30 under software control. Once the raw data is transferred, the time interval measurement and recirculation processes resume.

Once raw count data is available, the microprocessor 30 computes a corresponding quadrature count and quadrature frequency. Once computations are completed, this information is down loaded to a programmable quadrature pulse generator 34 which forms the RS 422 wave forms, delivered to the user's controller 16 through the channel A and channel B interface via connection 25.

Hardware Implementation

An illustrative hardware embodiment is depicted in FIG. 4. FIG. 4 has been divided into various panels 4A-4J which represent a preferred embodiment of the transducer; however, it should be appreciated that alternate components and hardware partitioning can be adopted by one of skill in the art without departing from the scope of this invention. In general, the system is built around the Intel 8031 single-component microcomputer 30 and related peripherals.

The computations performed in the output conversion module 22 require both program memory (firmware) and user supplied parameter data.

Non-volatile memory is provided for storage of certain user defined parameters. DIP switches are provided to permit entry of user data, and for configuring the system.

In the illustrative circuitry, a significant amount of combinational logic has been implemented with programmable array logic.

Figure 4A:
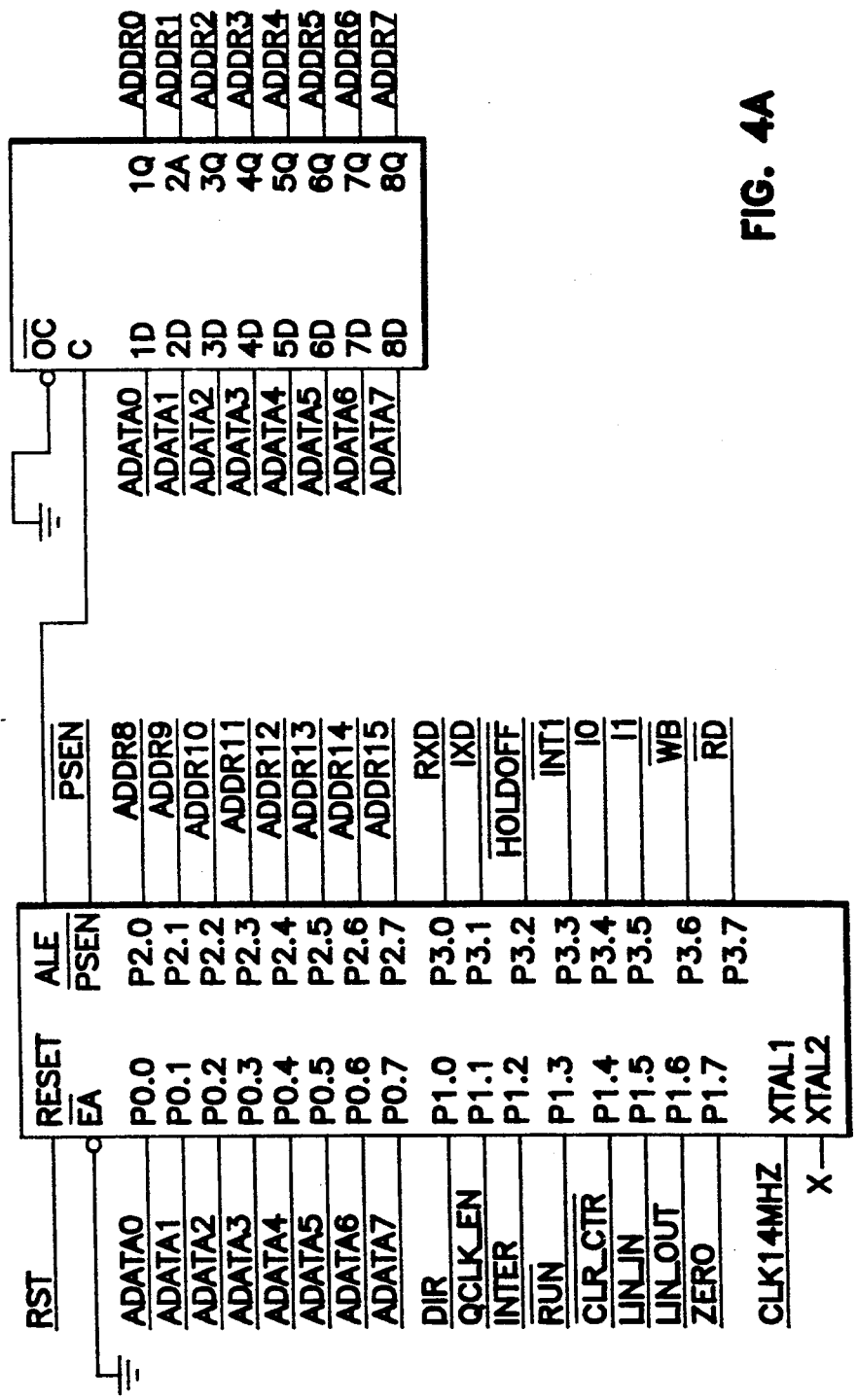
FIGS. 4A-4J are schematic diagram depicting an illustrative embodiment of the invention, the figure is divided into panels FIG. 4A through FIG. 4J.

FIG. 4A identifies certain signal naming conventions and shows the use of a de-multiplexing chip 29 to decode the address lines of the Intel 8031AH microcontroller corresponding to CPU 30.

Figure 4B:
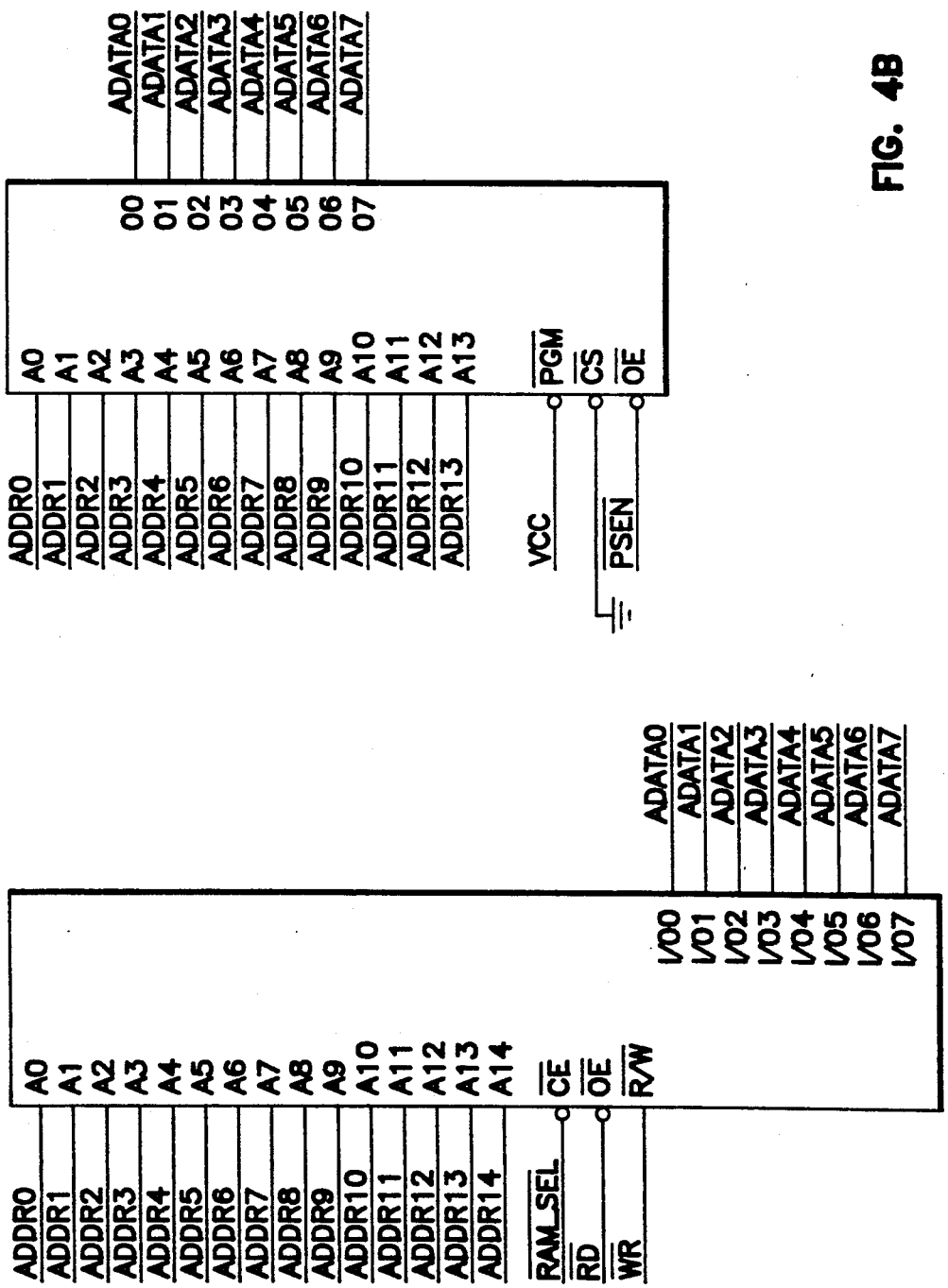

FIG. 4B shows two memory parts. The 27128 is a non-volatile memory for storing program firmware and correspond to 36. The 5C2568 is a static RAM 35 used for scratch pad memory for the CPU 30.

Figure 4C:
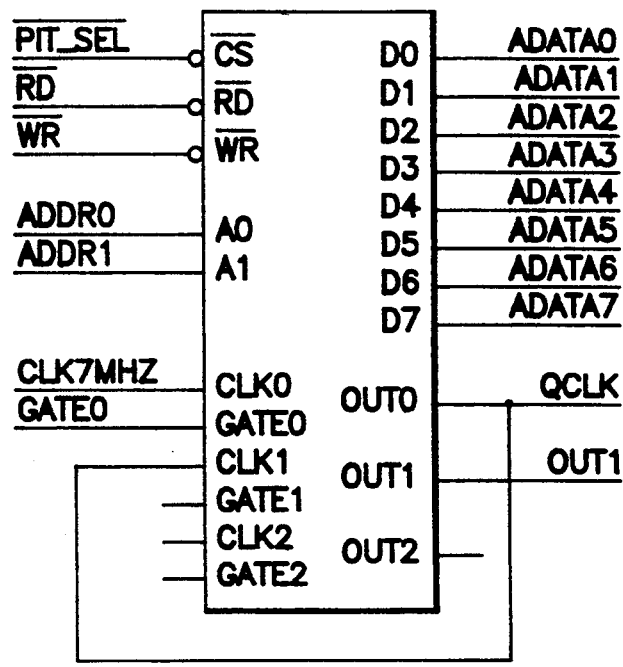

FIG. 4C depicts the Intel 8254 programmable interval timer (PIT) forming a portion of the quadrature pulse generator 34. This component may be used as either a timer or counter. In this application it is treated as a port and the number of quadrature pulses required for output is written as the initial count, to the counter. The rate at which these counts are delivered to the PAL for conversion to quadrature pulses on channel A and B is selected in software, and output to the square-wave-in-quadrature pulse generator 34.

Figure 4D:
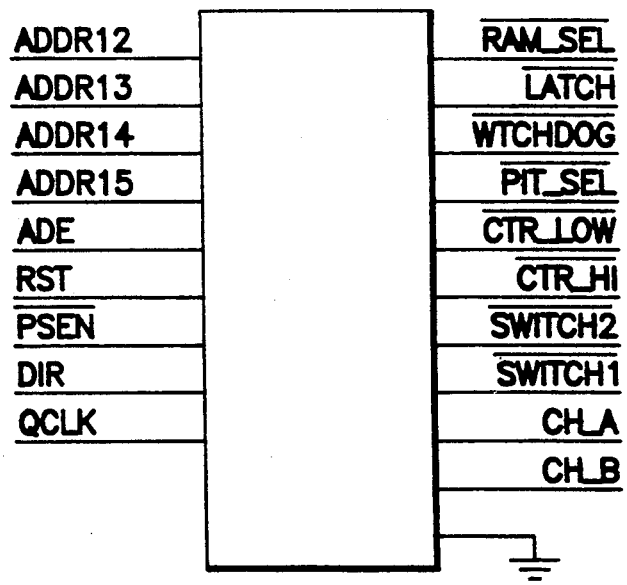

FIG. 4D depicts a semi custom programmable logic array (PAL) which performs a number of Boolean conversions on input terms presented to pins 2 through 10. This PAL 37 cooperates with the PIT to generate the quadrature pulses from the terminal count data on PIT out1, and the quadrature clock data from PIT QCLK (see FIG. 4C).

Figure 4E:
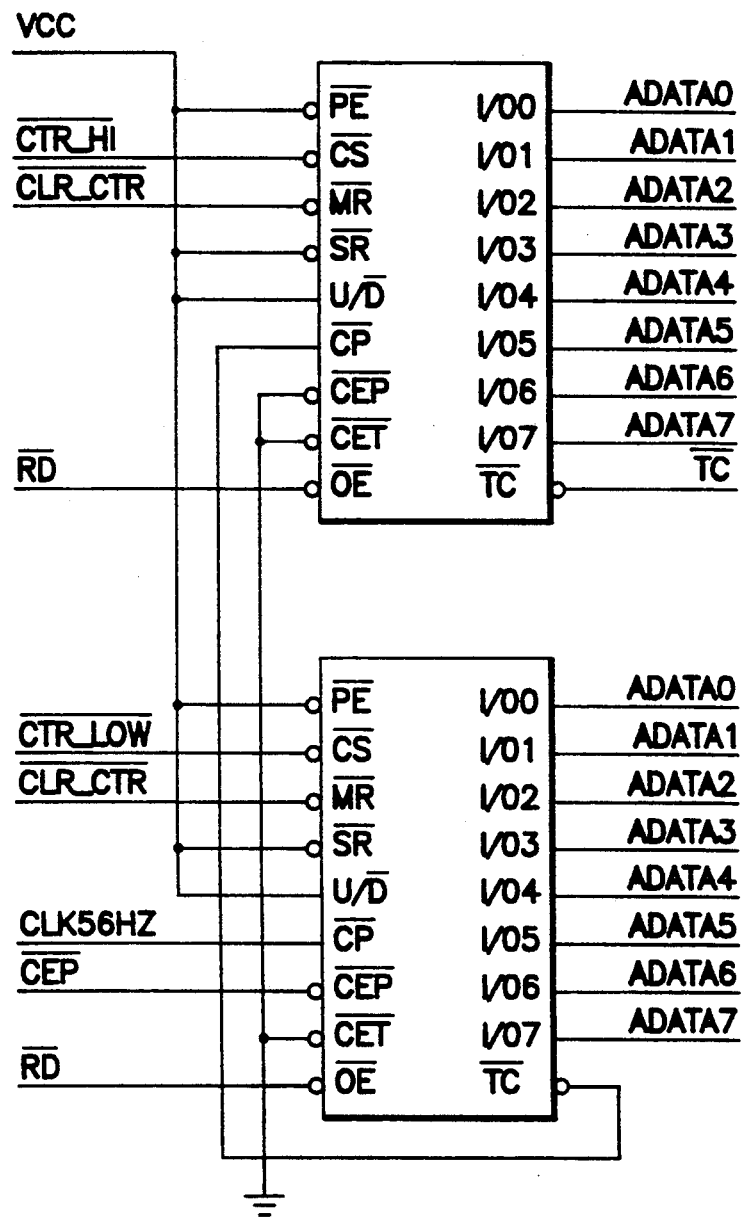

FIG. 4E depicts high speed TTL counter 31 which are concatenated with a counter internal to the CPU 30 to collect the "raw count". In general it is desirable to operate with as high a clock speed as possible to enhance position resolution. The external counters collect the lowest order bytes of the 24 bit raw counter word. These structures correspond to counter 31 in FIG. 3.

Figure 4F:
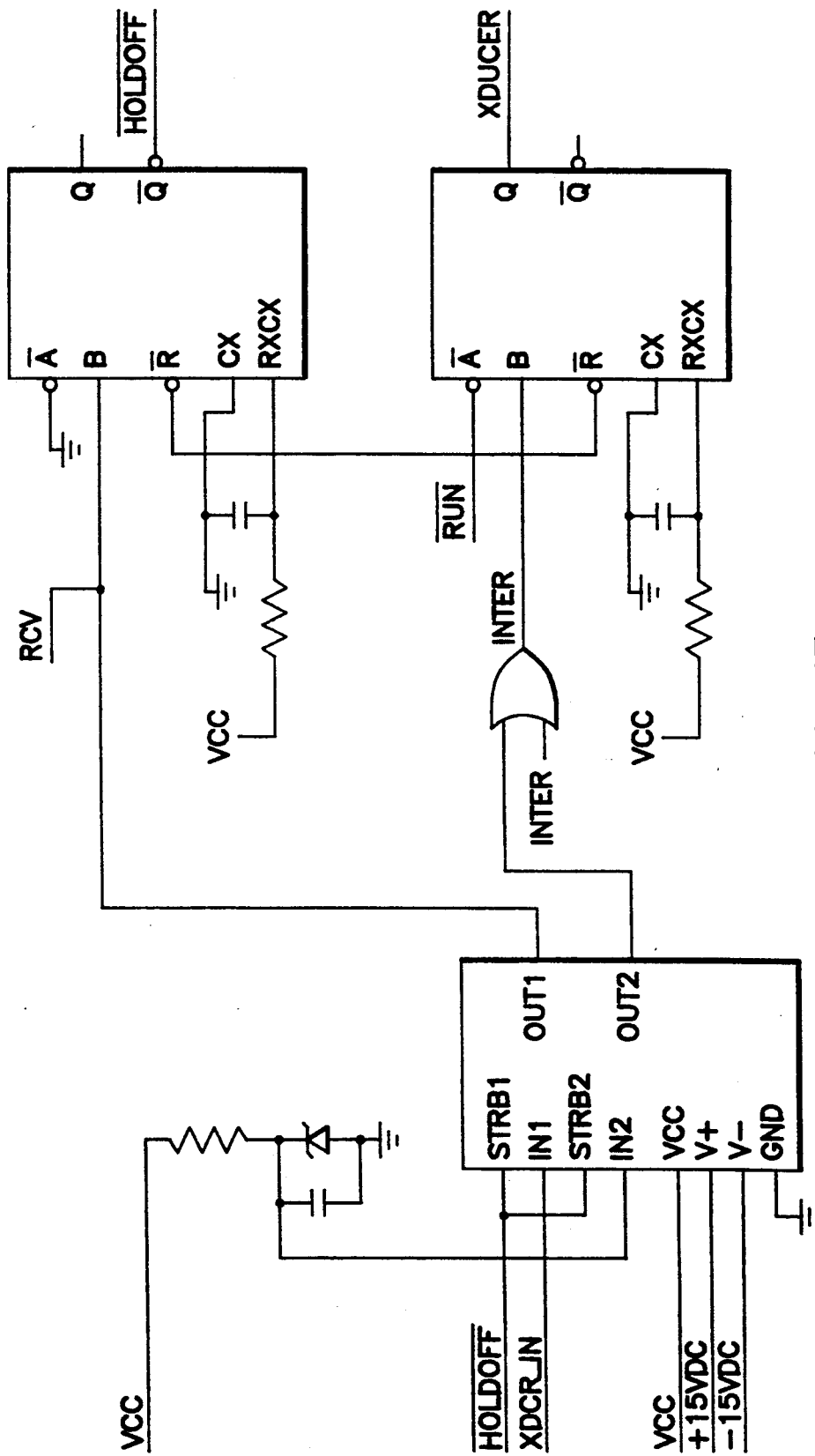

FIG. 4F shows the counter control and recirculation logic 29. The linear comparator 43 accepts the "echo" signal from the sensor module 20 while the pulse forming one shot generates an XDUCER signal corresponding to the "interrogation" signal 26.

Figure 4G:
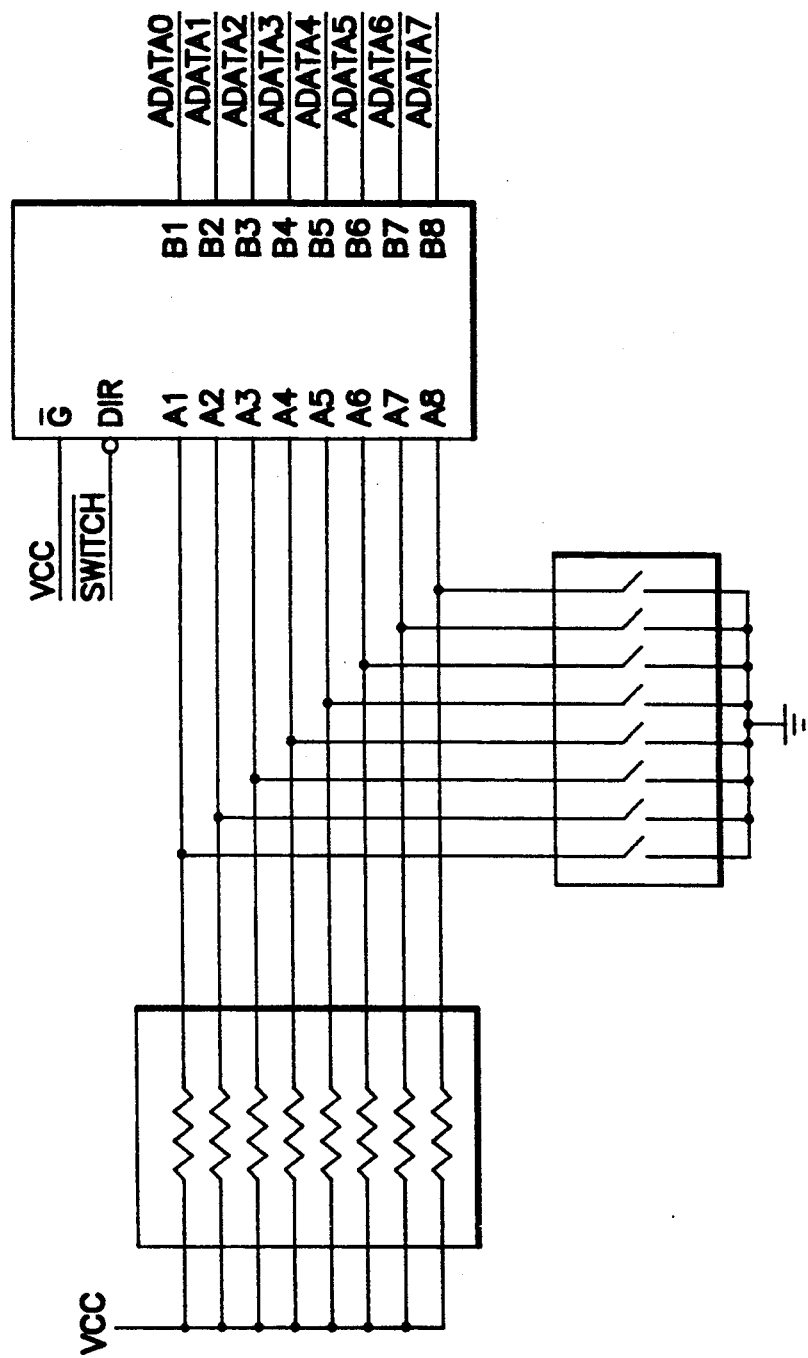

FIG. 4G depicts the resolution selection switch bank 39 which is debounced and latched by HCT245 latch 44.

Figure 4H:
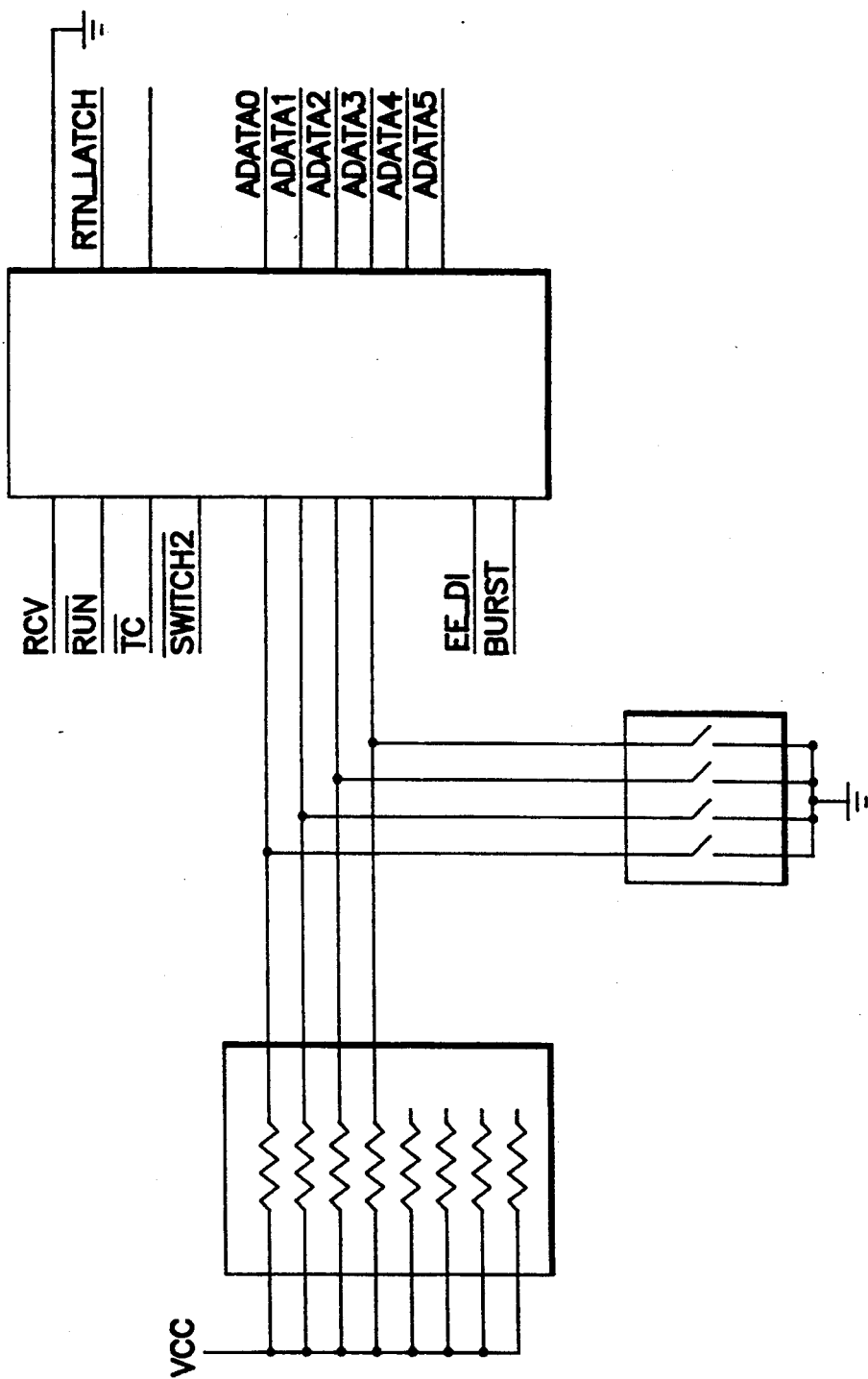

FIG. 4H depicts the switch bank for selection of zero position index set point and quadrature phase and gradient measurement protocol. These settings are debounced and decoded by the PAL 45, they are communicated to the CPU 30 through the data bus.

Figure 4I:
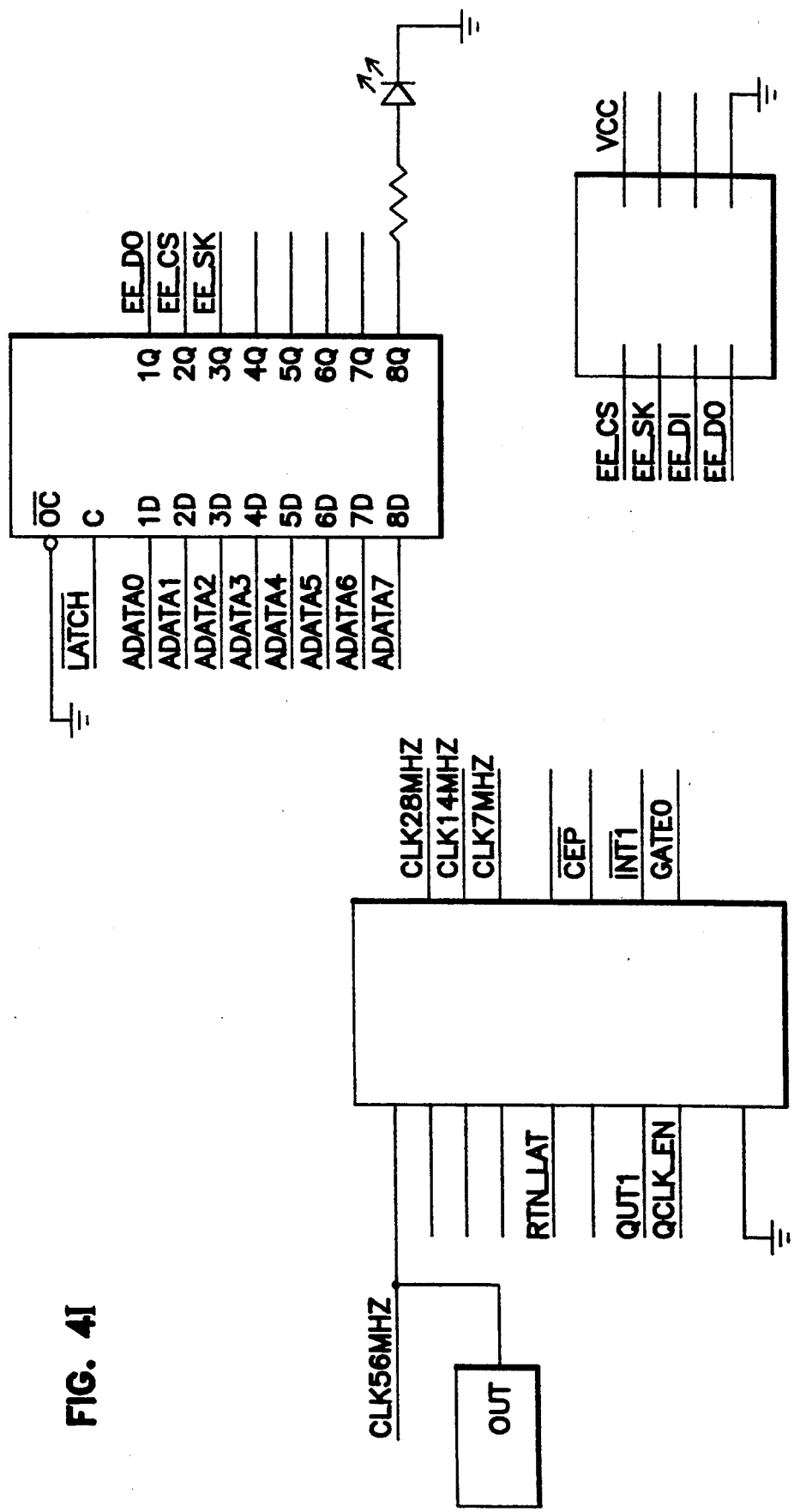
Figure 4J:
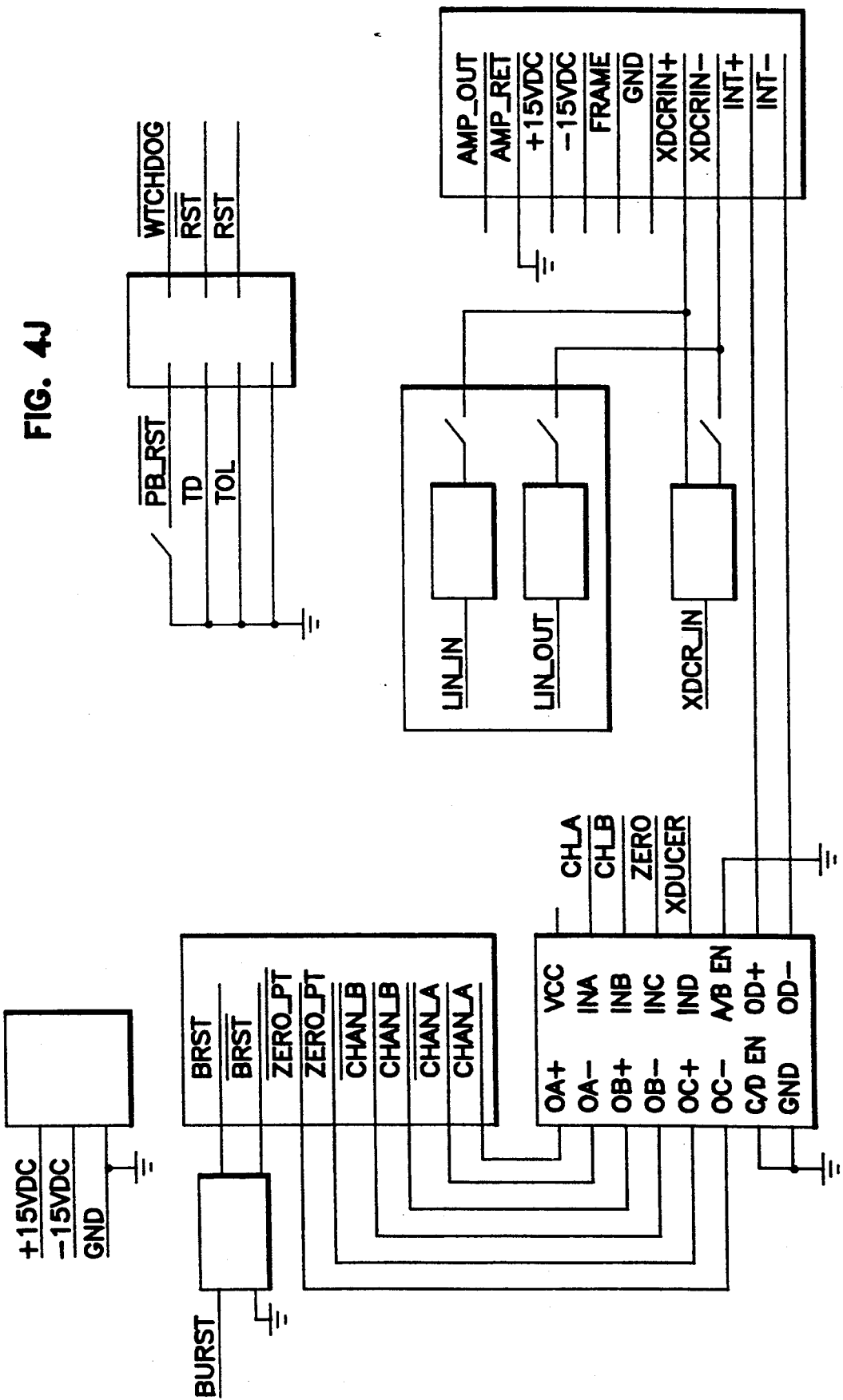

Certain incidental decoding functions set forth primarily on FIG. 4I and FIG. 4J are not presented in these figures, these include watch dog timer interconnections, clock division functions, and cabling and power supply connections, which should be readily discerned by one of ordinary skill in this art.

Software Implementation

The various software processes are independent and operate asynchronously with respect to each other. This improves system performance. It is important to note that the amount of time required to collect raw count data depends on several variables. Magnet location has a direct impact on the amount of time required to acquire the raw count. Also noise on the waveguide can extend the amount of time required to accumulate raw count data. The number and frequency of the quadrature pulses delivered to the user system also varies with magnet position and velocity. The partitioning of system function into these independent processes improves overall system performance.

Figure 5A:
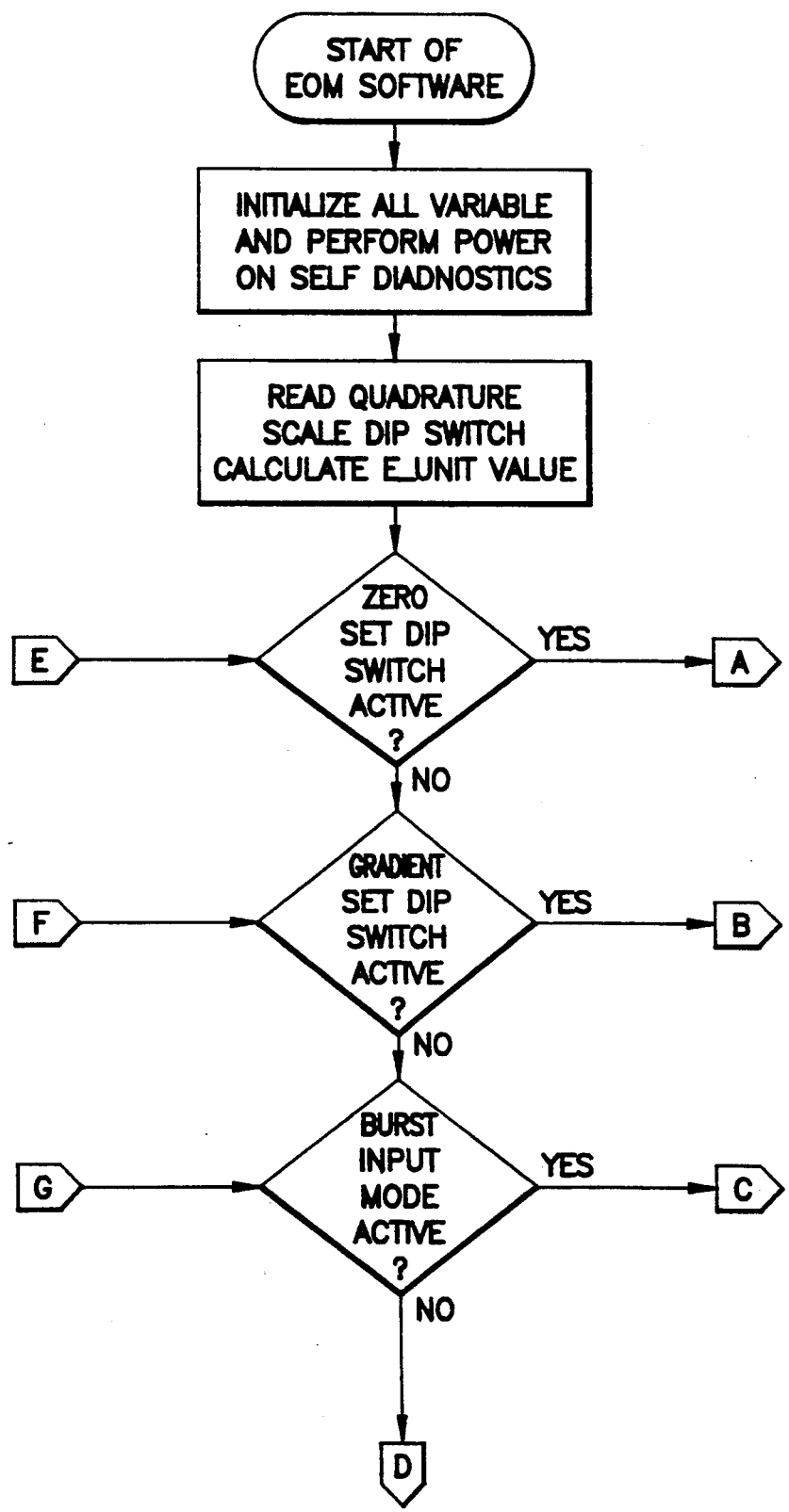
FIG. 5A is a flow chart showing the microprocessor initialization routine executed upon the start of the system.

As previously described several process are performed in software and flow charts for these main processes are described as follows:

FIG. 5A is a flow chart showing the initialization routine executed by the microprocessor upon power up. The routine initializes the variables in the source code, performs a self-diagnostic test, and then checks the state of various DIP switches 39 and 41.

Figure 5B:
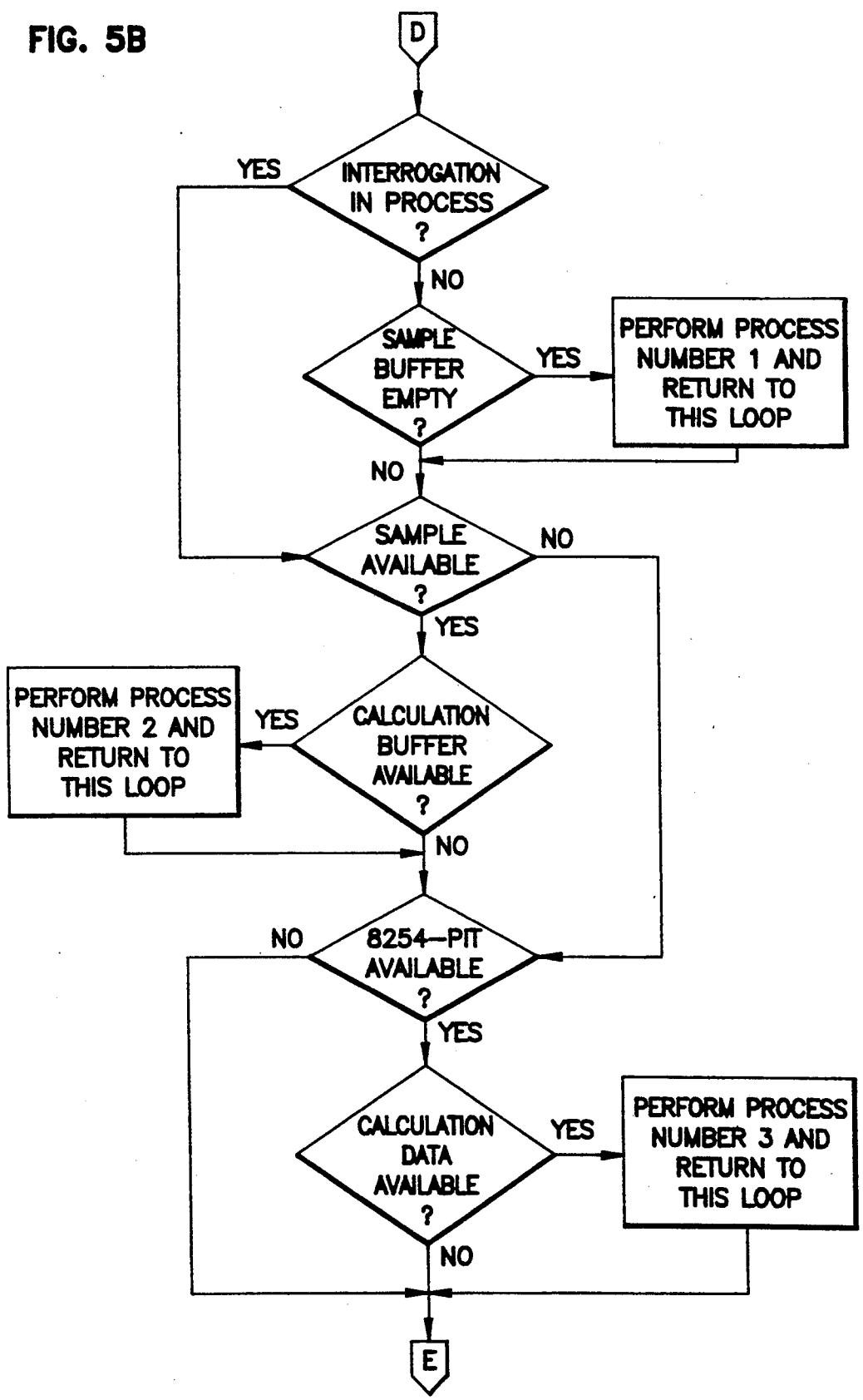
FIG. 5B is a flow chart showing the three main microprocessor routines, which are executed simultaneously.

After initialization, the microprocessor enters the main portion of the source code, as shown in FIG. 5B. While executing the main portion of the program, the microprocessor performs three discrete processes: (1) interrogation of the transducer and recirculation control; (2) mathematical conversion of the raw data corresponding to the linear displacement information into quadrature pulse count and velocity data; and (3) generation of the quadrature pulses.

Process No. 1: Interrogation and Recirculation

Figure 5C:
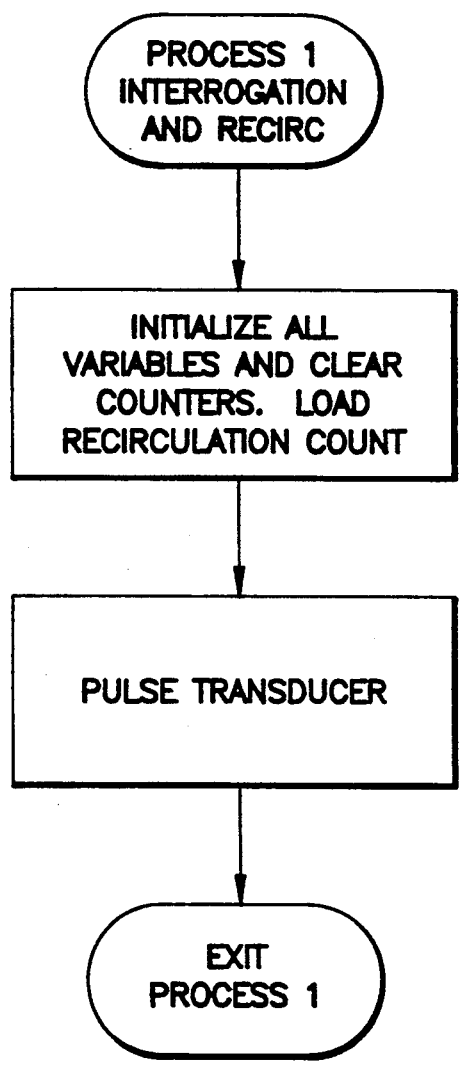
FIG. 5C is a flow chart showing the microprocessor routine for interrogation and recirculation cycle.
Figure 5D:
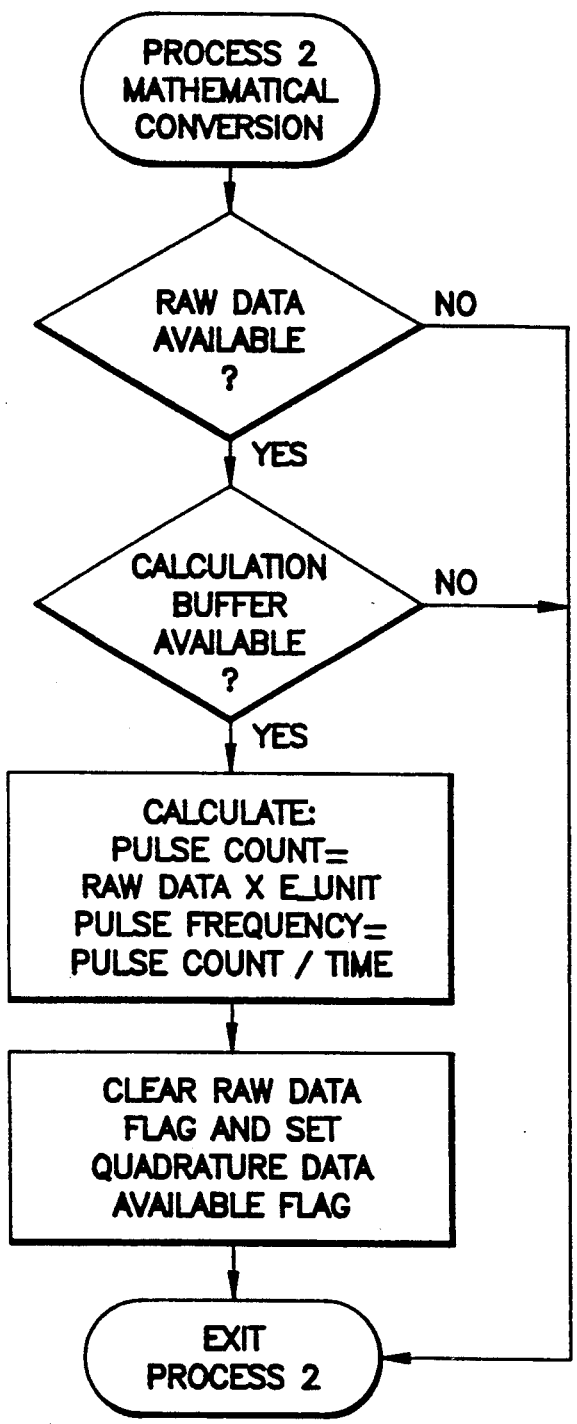
FIG. 5D is a flow chart showing the interrupt routine for the interrogation and recirculation cycle.

FIGS. 5C and 5D are flow charts showing the method by which the microprocessor performs the interrogation of the waveguide and recirculation routine. The microprocessor first initializes all variables, clears counters, and then loads the recirculation count into the recirculation counter. Next, the microprocessor initiates an "interrogate" signal which causes an excitation pulse on the waveguide. The corresponding echo or return signal is transmitted as an interrupt signal to the recirculation counter in the microprocessor. This interrupt signal causes the recirculation counter to be decremented by one.

The interrogation process is continuously repeated, and, each time the microprocessor receives an interrupt due to the return signal, the recirculation counter is decremented by one. When the recirculation count reaches a value of one, a hardware bit is set which will freeze the counters and all interrogation hardware upon receipt of the last return or echo signal. The last return signal interrupts the CPU of the microprocessor. After the microprocessor receives the last return signal, the raw count information, which is proportional to the physical location of the position magnet, is transferred from the external counters to the system RAM. The microprocessor may then start the process again for another interrogation and recirculation cycle.

Process No. 2: Mathematical Conversion

FIG. 5D is a flow chart which shows the microprocessor routine for converting the raw count data into quadrature pulse count and velocity data. The raw count received from the calculation buffer is converted into a quadrature pulse count by the following formula:

$$q=(C)(S)/(f)(G)(R) \quad (1)$$

The variables are defined as follows: q=quadrature pulse count; C=raw count data from the interrogation and recirculation routine; S=user-defined counts per inch setting; f=oscillator frequency of 56 MHz; G=transducer gradient; and R=number of recirculations (the value of the recirculation count).

The mathematical conversion routine also calculates the velocity of the quadrature pulses, which is directly proportional to the velocity of the position magnet. A counter, which acts as a timer, runs continuously in the microprocessor in order to record time elapsed between interrogation and recirculation cycles. The microprocessor reads the timer at the start and end of each interrogation and recirculation cycle to compute the total time elapsed.

The microprocessor also records the starting and ending physical positions of the magnet as represented by a quadrature pulse count. In order to calculate the velocity of the magnet, the mathematical routine divides the change in position of the magnet (the distance the magnet has moved) by the elapsed time. The velocity data, like the quadrature pulse count data, is stored in RAM so that the mathematical conversion routine is able to immediately begin processing a new set of raw count data values.

Process No. 3: Generation of Quadrature Pulses

Figure 5E:
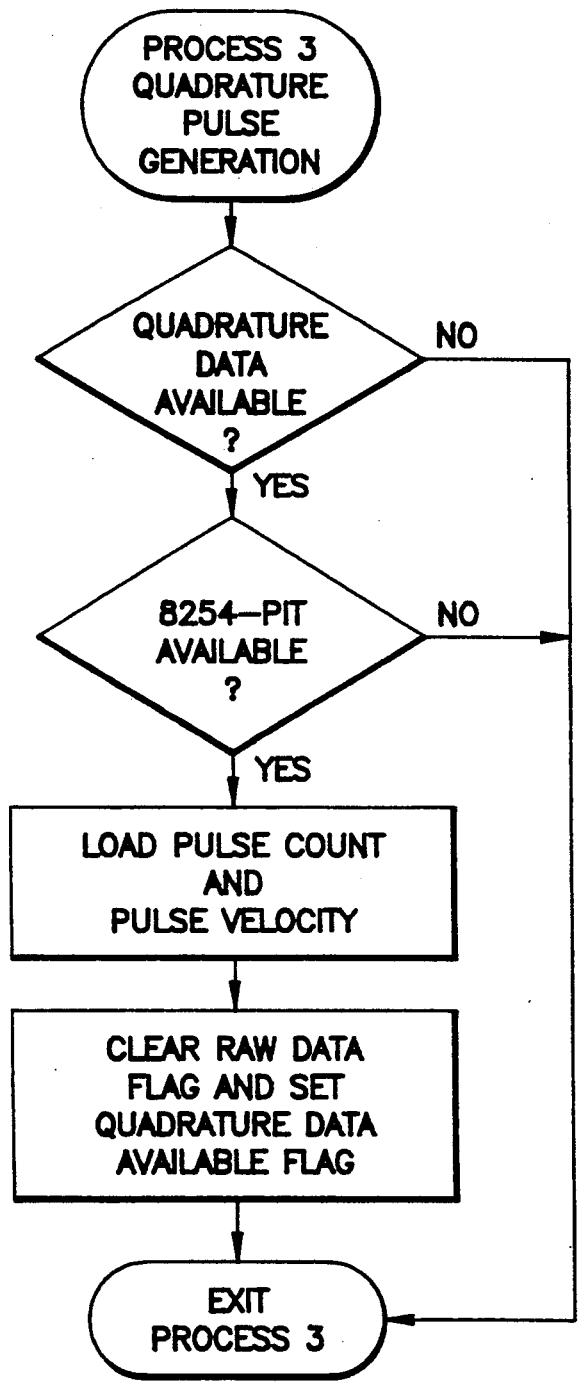
FIG. 5E is a flow chart showing the microprocessor routine for mathematical conversion of the raw count data received from the interrogation and recirculation cycle.
Figure 5F:
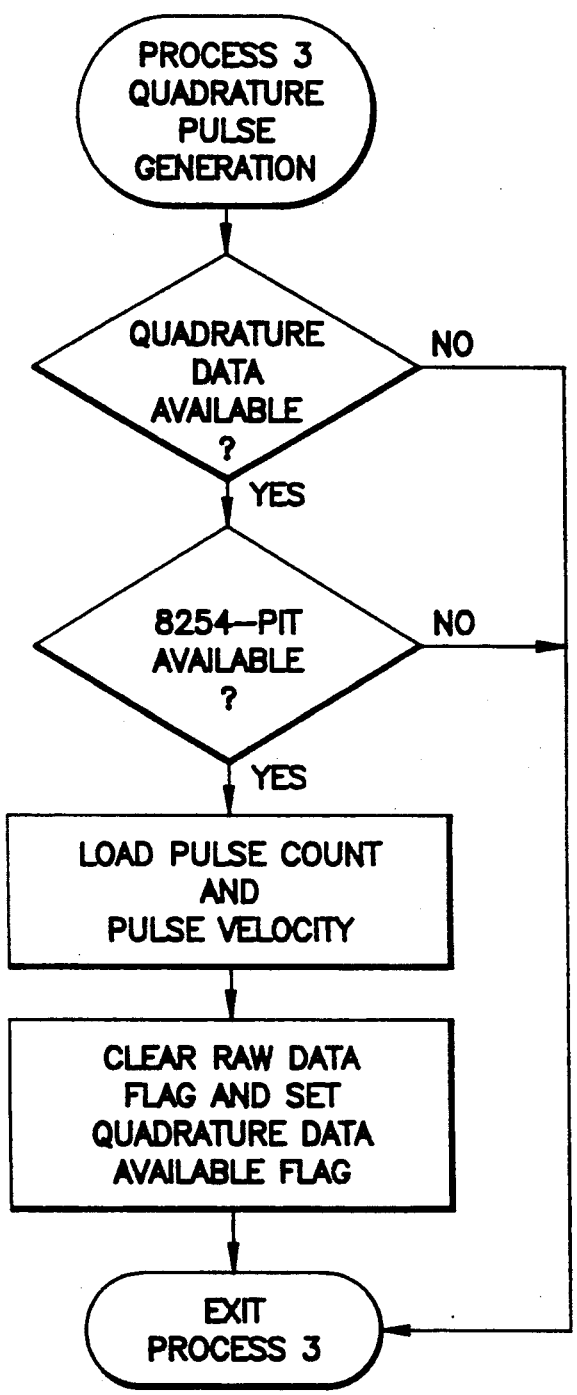
FIG. 5F is a flow chart showing the microprocessor routine for the generation of the quadrature pulses.

FIG. 5E is a flow chart which shows the microprocessor routine for generating quadrature pulses. When quadrature pulse count data is available from the conversion routine, the data from the mathematical conversion is loaded into a programable interval timer. The interval timer generates the actual quadrature pulses from the quadrature pulse count data, the number of pulses generated being equal to the quadrature pulse count. The interval timer also performs the division required to calculate the velocity component of the quadrature pulses.

When the pulse generation is complete, the interval timer interrupts the microprocessor to receive another set of data values from the mathematical conversion routine, if another set is available.

Setting of Zero Point to Generate Index Pulse

Figure 5G:
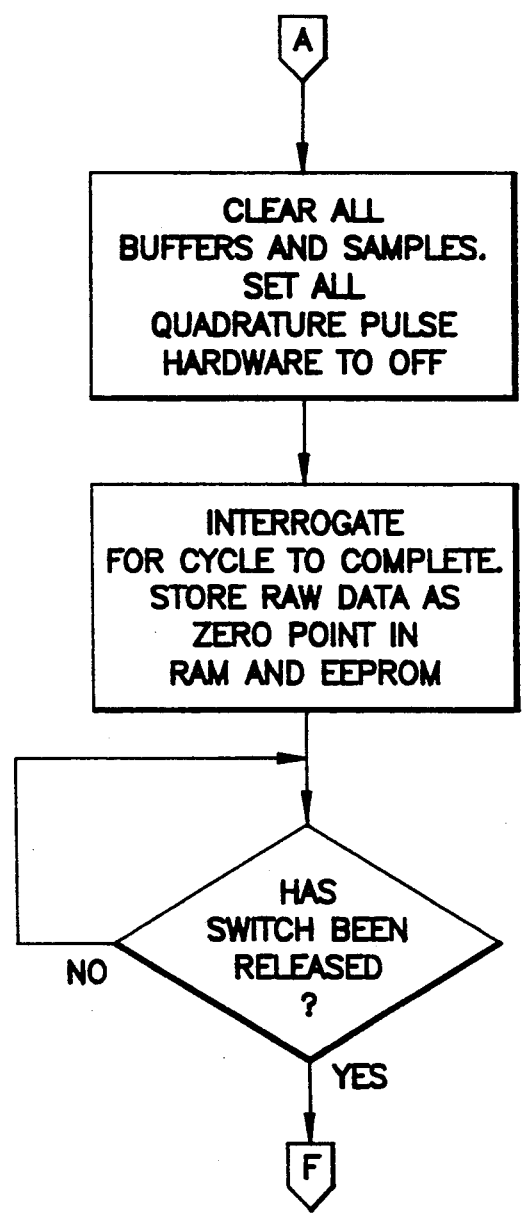
FIG. 5G is a flow chart showing the microprocessor routine for setting a zero point to generate an index pulse.

FIG. 5G is a flow chart which shows the microprocessor routine for establishing a zero point (index mark). The EOM has the unique capability of establishing a zero point, as programmed by the user, at any position on the wave guide. As the position magnet crosses the zero point, an index marker pulse is generated and transmitted to the microprocessor.

To program the zero point, the user moves the magnet to the desired position of the zero point on the wave guide. Next, the user toggles a switch on the EOM, which causes an interrogation of the wave guide. The raw data of the return signal, which corresponds to the zero point, is stored in RAM and EEPROM so that the value of the zero point is saved even if the power is cycled.

Gradient Programming

Figure 5H:
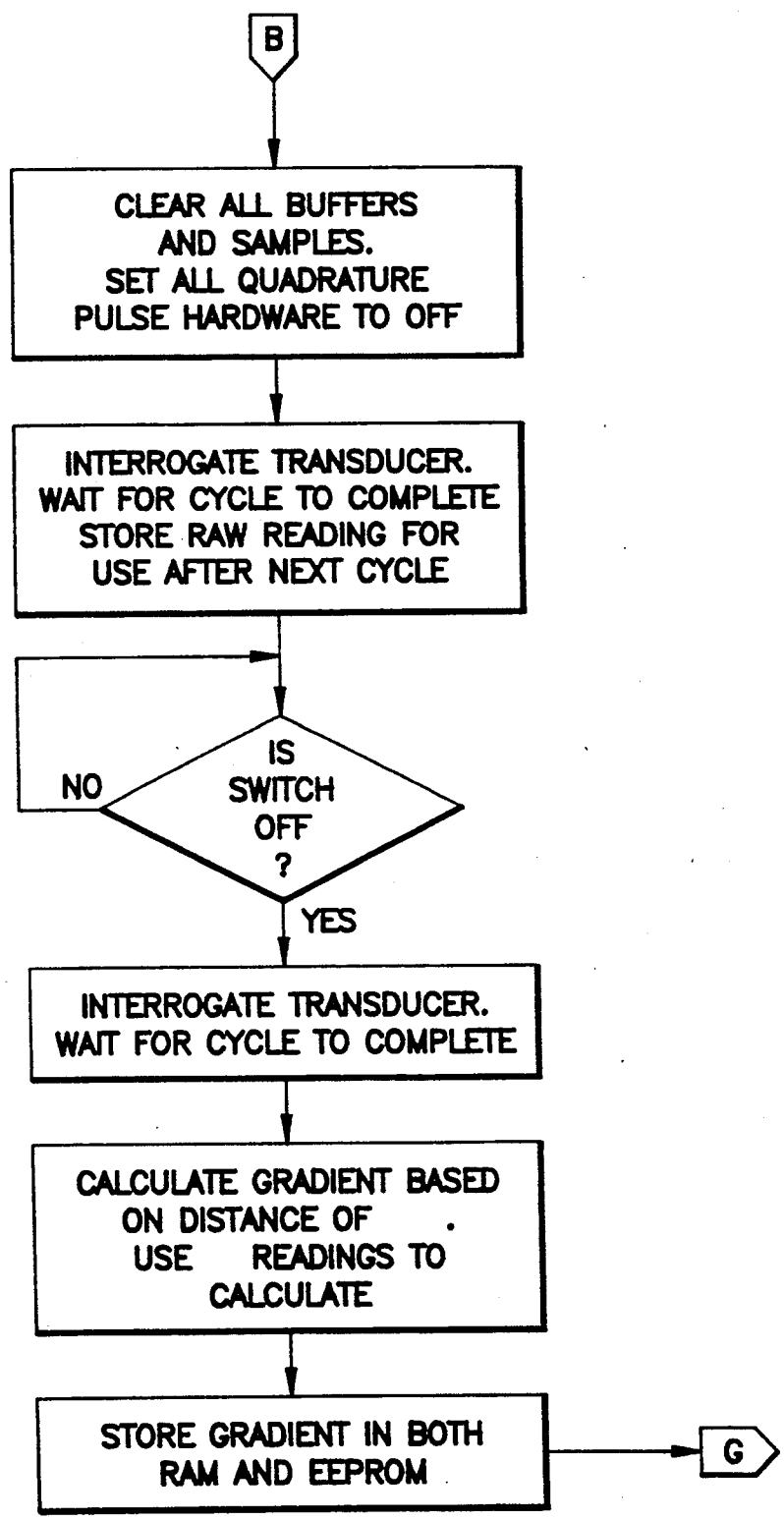
FIG. 5H is a flow chart showing the microprocessor routine for programming a gradient of the wave guide.
Figure 51:
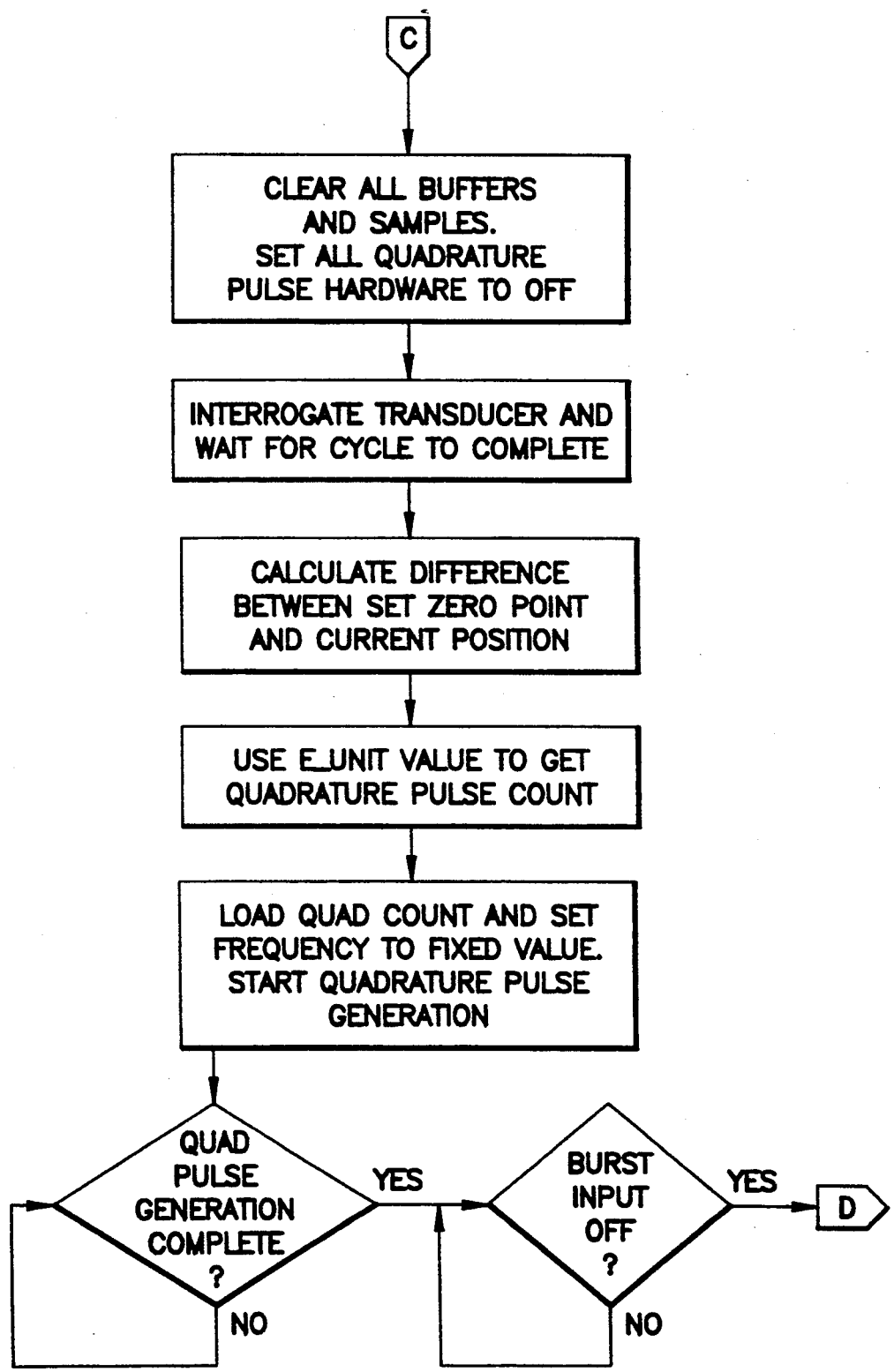

FIG. 5H is a flow chart showing the method by which the microprocessor establishes a gradient of the wave guide. Alternatively, if this process is not used, the microprocessor will use a default gradient which is stored in memory and is an approximated average of all transducer waveguides.

To program a gradient, the user positions the magnet at any point along the wave guide and presses a button on the module, which causes the microprocessor to interrogate the wave guide and store the corresponding return signal. Next, the user moves the magnet (for example) exactly ten inches and depresses the same button. The EOM again interrogates the wave guide and stores the return signal. By using the two return values, the microprocessor can determine the elapsed time between the two positions. Therefore, by knowing that the distance between those values is ten inches, the microprocessor calculates the velocity of the propagation of a sonic wave for this wave guide and stores this velocity (gradient) in non-volatile memory for use in future calculations.

Burst Mode

FIG. 5I is a flow chart showing the burst mode of operation. The burst mode enables the user to obtain current displacement information either synchronously or asynchronously.

In the asynchronous mode, the controller can activate a burst mode input signal on the EOM, and this will subsequently cause an interrogation of the wave guide. The EOM will respond with a fixed frequency pulse train of quadrature pulses that will provide the current magnet position with respect to the user-set zero point.

In the synchronous mode, the wave guide is continuously interrogated and the output conversion module constantly generates corresponding pulses relating to the position of the magnet with respect to the zero point. There is a one millisecond dwell time between bursts in this mode to allow the controller to clear internal counters and process the information.

Further details concerning the operation of the invention may be found in the 31 page appendix filed with the application forming a part of the specification.

What is claimed is:

1. A magnetostrictive transducer for generating an indication of a magnet position along a magnetostrictive gauge comprising:
   a magnetostrictive waveguide delay line;
   pulse generator means for generating interrogation pulses on said delay line, in response to interrogation pulses on said delay line, in response to interrogate signals;
   said magnet proximate said delay line, for converting interrogation pulses into acoustic pulses in said delay line, at the location of said magnet means;
   mode converter means coupled to said wave guide for converting said acoustic pulses into corresponding echo signals;
   time interval measuring means for measuring the time interval from interrogation signals to the reception of corresponding echo signals, and for generating a raw count value corresponding to said time measurement;
   output conversion means for converting said raw count value to a plurality of quadrature pulses where the number of quadrature pulses indicates the position of said magnet on said waveguide.

2. A magnetostrictive transducer for generating an indication of a magnet position along a magnetostrictive gauge comprising:
   a magnetostrictive waveguide delay line;
   pulse generator means for generating interrogation pulses on said delay line, in response to interrogation pulses on said delay line, in response to interrogate signals;
   said magnet proximate said delay line, for converting interrogation pulses into acoustic pulses in said delay line, at the location of said magnet means;
   mode converter means coupled to said waveguide for converting said acoustic pulses into corresponding echo signals;
   time interval measuring means for measuring the time interval from interrogation signals to the reception of corresponding echo signals, and for generating a raw count value corresponding to said time measurement;
   index position means for determining the count value for a defined index location along said waveguide and for producing an index value corresponding to said index location;
   output conversion means for generating an index pulse each time said magnet moves past said index location.

3. A magnetostrictive transducer for generating an indication of a magnet position along a magnetostrictive gauge comprising:
   a magnetostrictive waveguide delay line;
   pulse generator means for generating interrogation pulses on said delay line, in response to interrogation pulses on said delay line, in response to interrogate signals;
   said magnet proximate said delay line, for converting interrogation pulses into acoustic pulses in said delay line, at the location of said magnet means;
   mode converter means coupled to said waveguide for converting said acoustic pulses into corresponding echo signals;
   time interval measuring means for measuring the time interval from interrogation signals to the reception of corresponding echo signals, and for generating a raw count value corresponding to said time measurement;
   index position means for determining the count value for a defined location along said waveguide and for producing an index value corresponding to said index location;
   output conversion means for generating a fixed burst of output pulses corresponding to the distance of said magnet from said index location.

4. A magnetostrictive transducer for generating an indication of a magnet position along a magnetostrictive gauge comprising:
   a magnetostrictive waveguide delay line;
   pulse generator means for generating interrogation pulses on said delay line, in response to interrogation pulses on said delay line, in response to interrogate signals;
   said magnet proximate said delay line, for converting interrogation pulses into acoustic pulses in said delay line, at the location of said magnet means;
   mode converter means coupled to said waveguide for converting said acoustic pulses into corresponding echo signals;
   time interval measuring means for measuring the time interval from interrogation signals to the reception of corresponding echo signals, and for generating a raw count value corresponding to said time measurement;
   gradient measuring means for computing the transmission gradient of said waveguide for establishing a gradient value;
   output conversion means for converting said raw count value and said gradient value, to an output signal indicative of the position of said magnet on said waveguide.

5. The transducer of claim 1, wherein said time interval measuring means comprises:
   a free running fixed frequency clock, for generating clock pulses;
   a counter coupled to said clock for collecting and counting said clock pulses during the time interval corresponding to the time interval between the occurrence of said interrogation pulse and the subsequent occurrence of said echo signal, to generate said raw count value.

6. A magnetostrictive transducer for generating an indication of a magnet position along a magnetostrictive gauge comprising:

a magnetostrictive waveguide delay line;

pulse generator means for generating interrogation pulses on said delay line, in response to interrogation pulses on said delay line, in response to interrogate signals;

said magnet proximate said delay line, for converting interrogation pulses into acoustic pulses in said delay line, at the location of said magnet means;

mode converter means coupled to said waveguide for converting said acoustic pulses into corresponding echo signals;

time interval measuring means for measuring the time interval from interrogation signals to the reception of corresponding echo signals, and for generating a raw count value corresponding to said time measurement;

index position means for determining the count value for a defined index location at an arbitrarily selected position along said waveguide and for producing an index value corresponding to said index location;

output conversion means for generating an index output pulse each time said magnet moves past said index location.

7. The transducer of claim 6, wherein said output conversion means further comprises:

means for converting said raw count value to a plurality of quadrature pulses where the number of quadrature pulses indicates the position of said magnet on said waveguide.

8. The transducer of claim 6, wherein said output conversion means further comprises:

means for converting said raw count value to a plurality of quadrature pulses where the repetition rate of the quadrature pulses indicates the speed of said magnet on said waveguide.

9. The transducer of claim 8, wherein said output conversion means further comprises:

means for converting said raw count value to a plurality of quadrature pulses where the phase of said plurality of quadrature pulses indicates the direction of motion of said magnet on said wave guide.

10. The transducer of claim 6, wherein said output conversion means further comprises:

means for generating a fixed burst of output pulses corresponding to the distance of said magnet from said index location.

11. The transducer of claim 4, wherein said time interval measuring means comprises:

a free running fixed frequency clock, for generating clock pulses;

a counter coupled to said clock for collecting and counting said clock pulses during the time interval corresponding to the time interval between the occurrence of said echo signal, to generate said raw count value.

* * * * *

UNITED STATES PATENT AND TRADEMARK OFFICE
CERTIFICATE OF CORRECTION

PATENT NO.   :  5,206,586

DATED        :  April 27, 1993

INVENTOR(S) :  Yauch et al.

It is certified that error appears in the above-identified patent and that said Letters Patent is hereby corrected as shown below:

In column 1, line 8, "patent application" should
  read --Patent Application--

In column 1, line 43, after "Tellerman", please delete the word "which"

In column 2, line 25, after the word "feature", please insert
  --permitting the--

In column 3, line 41, "BRIEF DESCRIPTION OF THE DRAWING" should read
  --BRIEF DESCRIPTION OF THE DRAWINGS--

In column 3, line 52, after the word "schematic", please delete the
  word "diagram" and substitute therefor --diagrams--

In column 3, line 52, after the word "depicting", please delete
  the word "an"

UNITED STATES PATENT AND TRADEMARK OFFICE
CERTIFICATE OF CORRECTION

PATENT NO. : 5,206,586
DATED : April 27, 1993
INVENTOR(S) : Yauch et al.

It is certified that error appears in the above-identified patent and that said Letters Patent is hereby corrected as shown below:

In column 3, line 53, after the word "illustrative", please delete the word "embodiment" and substitute therefor --embodiments--

In column 4, line 54, please delete "3,898,55" and substitute therefor --3,898,555--

In column 7, line 1, after the word "several", please delete the word "process" and substitute therefor --processes--

Signed and Sealed this

Eighteenth Day of January, 1994

Attest:

BRUCE LEHMAN

*Attesting Officer*   *Commissioner of Patents and Trademarks*